United States Patent
Wakizaka et al.

(10) Patent No.: US 8,822,074 B2
(45) Date of Patent: Sep. 2, 2014

(54) ELECTRODE FOR LITHIUM-ION SECONDARY BATTERY

(75) Inventors: Yasuhiro Wakizaka, Yokohama (JP); Takumi Sugimoto, Kanagawa (JP)

(73) Assignee: Zeon Corporation, Tokyo (JP)

( * ) Notice: Subject to any disclaimer, the term of this patent is extended or adjusted under 35 U.S.C. 154(b) by 494 days.

(21) Appl. No.: 13/138,495

(22) PCT Filed: Feb. 26, 2010

(86) PCT No.: PCT/JP2010/053060
§ 371 (c)(1),
(2), (4) Date: Aug. 26, 2011

(87) PCT Pub. No.: WO2010/098434
PCT Pub. Date: Sep. 2, 2010

(65) Prior Publication Data
US 2011/0311870 A1    Dec. 22, 2011

(30) Foreign Application Priority Data
Feb. 27, 2009  (JP) ................. 2009-046986

(51) Int. Cl.
*H01M 4/62* (2006.01)
*H01M 4/13* (2010.01)
*H01M 4/64* (2006.01)
H01M 10/052 (2010.01)

(52) U.S. Cl.
CPC  *H01M 4/13* (2013.01); *H01M 4/64* (2013.01); *H01M 4/62* (2013.01); *H01M 4/621* (2013.01); *H01M 4/622* (2013.01); *H01M 10/052* (2013.01); *Y02E 60/122* (2013.01)
USPC ........ 429/217; 429/232; 429/233; 252/182.1; 427/58

(58) Field of Classification Search
CPC ....... H01M 4/622; H01M 4/621; H01M 4/62; H01M 4/13; H01M 2004/02; H01M 2004/027; H01M 2004/028; H01M 4/64
USPC .......... 429/217, 232, 233; 252/182.1; 427/58
See application file for complete search history.

(56) References Cited

U.S. PATENT DOCUMENTS

| | | | |
|---|---|---|---|
| 6,365,299 | B1 | 4/2002 | Miyaki et al. |
| 2008/0044733 | A1 | 2/2008 | Ohata et al. |

FOREIGN PATENT DOCUMENTS

| | | | |
|---|---|---|---|
| JP | 9-180703 | A | 7/1997 |
| JP | 9-213366 | A | 8/1997 |
| JP | 11-25956 | A | 1/1999 |
| JP | 2005-353584 | A | 12/2005 |
| JP | 2008-103344 | A | 5/2008 |
| JP | 2008-103345 | A | 5/2008 |

OTHER PUBLICATIONS

PCT/ISA/210—International Search Report dated May 25, 2010 for PCT/JP2010/053060.

*Primary Examiner* — Laura Weiner
(74) *Attorney, Agent, or Firm* — Birch, Stewart, Kolasch & Birch, LLP

(57) ABSTRACT

Disclosed is an electrode for a lithium-ion secondary battery which includes a porous membrane layer that is inhibited from decreasing in flexibility. The electrode for lithium-ion secondary battery comprises a current collector and, formed thereon in the following order, an electrode active-material layer comprising an electrode active material, a thickener, and a binder and a porous membrane layer containing an inorganic filler, wherein the binder is one which, when used to form a composite film comprising the binder and the thickener, forms a spherical island phase in a cross section of the composite film, the island phase having an average diameter of 0.5 μm or larger. The binder preferably is an unsaturated carboxylic acid ester polymer having a content of alkyl acrylate monomer units of 85 mass % or higher.

3 Claims, No Drawings

ELECTRODE FOR LITHIUM-ION SECONDARY BATTERY

TECHNICAL FIELD

The present invention relates to an electrode for a lithium-ion secondary battery, and particularly relates to an electrode for a lithium-ion secondary battery, able to inhibit reduction in adhesion strength and to improve flexibility of the porous membrane layer, when applying inorganic filler dispersing slurry on an electrode active material layer to form a porous membrane layer.

BACKGROUND ART

A chemical battery such as lithium-ion secondary battery is provided with a separator between a positive electrode and a negative electrode, serving for electrically insulating respective electrodes and further keeping electrolytic solution. Also, in the lithium-ion secondary battery, a microporous film mainly made of polyethylene, polypropylene and the like are currently used. However, the microporous film is easily shrunk at high temperature in general. Therefore, when internal short-circuit occurs or when a sharp projection such as nail penetrates the battery, the separator is shrunk by instantly generated short-circuit heat to extend a short-circuit portion, which may further cause a large amount of heat of reaction to facilitate abnormal overheat.

For improving safety including the above problems, it is proposed to apply an inorganic filler dispersing slurry on a surface of an electrode active material layer followed by drying to form a porous membrane layer (Patent Document 1).

The inorganic filler dispersing slurry can be prepared by mixing inorganic filler, binder, and dispersion medium of the inorganic filler. Thus-prepared inorganic filler dispersing slurry is applied on the surface of the electrode active material layer, followed by drying with hot air.

[Patent Document 1] The Japanese Unexamined Patent Publication H7-220759

DISCLOSURE OF INVENTION

Problem to be Solved by the Invention

However, the method disclosed in Patent Document 1 has problems such as reduced flexibility of the porous membrane layer and swollen electrode, which cause to reduce yield in production process of a lithium-ion secondary battery. Consequently, the purpose of the present invention is to provide an electrode for a lithium-ion secondary battery able to inhibit reduction in flexibility of a porous membrane layer.

Means for Solving the Problem

As a result of keen research for solving the above problems, the present inventors found that it is effective for improving flexibility of a porous membrane layer to improve adhesion strength between a collector and an active material layer after applying and drying an inorganic filler dispersing slurry. Also, it was found that by using a binder, which forms a specific spherical island phase in the cross-section of a composite membrane when forming the composite membrane including this binder and a thickener, as a binder forming an electrode active material layer, it is possible to inhibit reduction in adhesion strength of the electrode active material layer and swelling of the electrode caused by coating of the porous membrane layer. Based on the findings, the present invention was achieved.

Thus, according to the present invention, there is provided an electrode for a lithium-ion secondary battery, comprising an electrode active material layer including an electrode active material, a thickener and a binder, and a porous membrane layer including inorganic filler, in an order of the electrode active material layer and the porous membrane layer from a collector side, wherein the binder forms a spherical island phase having an average diameter of 0.5 μm or more in a cross-section of a composite membrane including the binder and the thickener. Also, the binder is preferably unsaturated carboxylic ester based polymer in which a content rate of an acrylic acid alkyl ester monomer unit is 85 mass % or more. Also, a glass-transition temperature of a homopolymer of the acrylic acid alkyl ester monomer is preferably −20° C. or less. A degree of polymerization of the thickener is preferably 1,000 to 3,000.

According to a second embodiment of the present invention, there is provided a lithium-ion secondary battery provided with a positive electrode, a negative electrode and an electrolytic solution, wherein at least one of the positive electrode and negative electrode is the above electrode.

Effects of the Invention

According to the present invention, in response to the problem that adhesion strength between the collector and the electrode active material layer is reduced because a dispersion medium in the inorganic filler dispersing slurry is permeated into the electrode active material layer after applying and drying the inorganic filler dispersing slurry, a binder, which forms a spherical island phase having an average diameter of 0.5 μm or more in the cross-section of a composite membrane including this binder and a thickener, is used as a binder forming an electrode active material layer. Thus, it is possible to obtain an electrode for a lithium-ion secondary battery, able to inhibit reduction in adhesion strength between the collector and the electrode active material layer because this binder can inhibit permeation of the dispersion medium; to improve flexibility of the porous membrane layer; and further to inhibit swelling of the electrode.

Also, for the problem that the separator is shrunk to expand short-circuit portion, another method, in which an adhesion layer is coated between the separator and the electrode active material layer for adhering of these two, has been widely known in addition to the method, in which the inorganic filler dispersing slurry is applied onto the surface of the active material layer followed by drying to form the porous membrane layer. The present invention can also contribute to improving adhesiveness of the separator and electrode active material layer.

EMBODIMENTS FOR WORKING THE INVENTION

Hereinafter, the present invention will be described in detail.

The electrode for a lithium-ion secondary battery of the present invention comprises an electrode active material layer including an electrode active material, a thickener and a binder, and a porous membrane layer including inorganic filler, in an order of the electrode active material layer and the porous membrane layer from a collector side, wherein the binder forms a spherical island phase having an average diameter of 0.5 μm or more in a cross-section of a composite membrane including the binder and the thickener.

<Collector>

The collector used in the present invention is not particularly limited as far as it has electrical conductivity and electrochemical resistance, and in view of heat resistance, for example, metallic material such as iron, copper, aluminum, nickel, stainless steel, titanium, tantalum, gold and platinum is preferable. Among these, aluminum is particularly preferable for the positive electrode of a lithium-ion secondary battery and copper is particularly preferable for the negative electrode. The shape of the collector is not particularly limited, and is preferably sheet-like shape having a thickness of 0.001 to 0.5 mm or so. The collector is preferably used after roughening treatment for increasing adhesive strength to the electrode active material layer. As a roughening method, there may be mentioned mechanical method of polishing, electropolishing, chemical polishing, etc. In the mechanical method of polishing, coated abrasive with adhering abrasive particles, grinding stone, emery buff, wire-brush provided with steel wire, etc. can be used. Also, for increasing the adhesion strength and conductivity of the collector-electrode active material layer, an intermediate layer may be formed on the surface of the collector.

<Electrode Active Material Layer>
<Active Material>

The active material used in the present invention can properly be selected according to the type of the electrode. The active material may be any compound that can normally be used in a lithium-ion secondary battery. As the active material for the positive electrode of a lithium-ion secondary battery, there may be illustrated lithium-containing composite metallic oxides such as $LiCoO_2$, $LiNiO_2$, $LiMnO_2$, $LiMn_2O_4$, and $LiFeVO_4$; transition metallic sulfides such as $TiS_2$, $TiS_3$ and amorphous MoS3; transition metallic oxides such as $Cu_2V_2O_3$, amorphous $V_2O$—$P_2O_5$, $MoO_3$, $V_2O_5$ and $V_6O_{13}$. Furthermore, conductive polymers such as polyacetylene and poly-p-phenylene can be used. An iron-based oxide, poor in electric conductivity, may be used as an active material coated with carbon material by reduction firing in the presence of the source of carbon. Also, these compounds may partially be element substituted.

Also, as the active material for the negative electrode of a lithium-ion secondary battery, for example, there may be mentioned carbonaceous material such as amorphous carbon, graphite, natural black lead, mesocarbon microbead (MCMB) and pitch-based carbon fiber, conductive polymer such as polyacene, etc. The electrode active material in which a conductivity providing agent is adhered to its surface by mechanical reforming process can also be used.

<Binder>

The binder used in the present invention forms a spherical island phase having an average diameter of 0.5 μm or more in the cross-section of the composite membrane including this binder and the thickener. The after-mentioned inorganic filler dispersion medium used for forming the porous membrane layer can thereby be prevented from permeation between the collector and the electrode active material layer, by which reduction in adhesion strength of the electrode can be inhibited.

As the binder used in the present invention, although not particularly limited as far as it can form the above island phase, unsaturated carboxylic ester based polymer is preferable because polymers are easily fused to increase the area of the island phase. The unsaturated carboxylic ester based polymer is a polymer including a monomer unit of acrylic acid ester and/or methacrylic acid ester. Specifically, it is homopolymer or copolymer of acrylic acid ester and/or methacrylic acid ester, or copolymer of acrylic acid ester and/or methacrylic acid ester and a monomer copolymerizable thereto.

In acrylic acid ester and methacrylic acid ester, acrylic acid alkyl esters are preferable; acrylic acid alkyl esters in which glass-transition temperature of the homopolymer thereof is −20° C. or less are more preferable; and acrylic acid alkyl esters in which glass-transition temperature of the homopolymer thereof is −30 to −70° C. are particularly preferable. By using the acrylic acid alkyl ester in which the glass-transition temperature of the homopolymer thereof is within the above range, glass-transition temperature of the obtained unsaturated carboxylic ester based polymer can be normal temperature or less, so that in the composite membrane of the thickener and the binder, the island phases of the binder can easily be fused to obtain larger island structure.

Among the acrylic acid alkyl esters in which glass-transition temperature of the homopolymer thereof is −20° C. or less, at least one selected from the group consisting of ethyl acrylate, butyl acrylate and 2-ethylhexyl acrylate is particularly preferable. By using at least one selected from the group consisting of ethyl acrylate, butyl acrylate and 2-ethylhexyl acrylate as the acrylic acid alkyl ester in which glass-transition temperature of the homopolymer thereof is −20° C. or less, it is possible to improve adhesion strength of an interface between the electrode active material layer and the collector.

Content rate of the acrylic acid alkyl ester monomer unit in the unsaturated carboxylic ester based polymer is preferably 85 mass % or more, more preferably 87 mass % or more and further more preferably 90 mass % or more, and the upper limit is 99 mass %.

In the present invention, when using other acrylic acid alkyl ester and/or methacrylic acid alkyl ester such as methyl methacrylate, in combination with the acrylic acid alkyl ester in which glass-transition temperature of the homopolymer thereof is −20° C. or less, as the monomer, content rate of the other acrylic acid alkyl ester and/or methacrylic acid alkyl ester in the copolymer is preferably 20 mass % or less.

As the monomer copolymerizable to the acrylic acid alkyl ester, there may be mentioned unsaturated carboxylic acids such as acrylic acid, methacrylic acid, itaconic acid and fumaric acid; carboxylic acid esters having 2 or more carbon-carbon double bonds such as ethylene glycol dimethacrylate, diethylene glycol dimethacrylate and trimethylolpropane triacrylate; styrene-based monomers such as styrene, chlorostyrene, vinyl toluene, t-butyl styrene, vinyl benzoic acid, vinyl methyl benzoate, vinylnaphthalene, chloromethyl styrene, hydroxymethylstyrene, α-methylstyrene and divinylbenzene; amide-based monomers such as acrylamide, N-methylol acrylamide and acrylamide-2-methylpropanesulfonic acid; α,β-unsaturated nitrile compounds such as acrylonitrile and methacrylonitrile; olefins such as ethylene and propylene; diene-based monomers such as butadiene and isoprene; halogen atom containing monomers such as vinyl chloride and vinylidene chloride; vinylesters such as vinyl acetate, vinyl propionate, vinyl butyrate and vinyl benzoate; vinyl ethers such as allylglycidylether, methyl vinyl ether, ethyl vinyl ether and butyl vinyl ether; vinyl ketones such as methyl vinyl ketone, ethyl vinyl ketone, butyl vinyl ketone, hexyl vinyl ketone and isopropenyl vinyl ketone; heterocyclic ring containing vinyl compounds such as N-vinyl pyrrolidone, vinylpyridine and vinylimidazole. Among these copolymerizable monomers, at least one selected from the group consisting of carboxylic acid esters having 2 or more carbon-carbon double bonds, amide-based monomers, α,β-unsaturated nitrile compounds and vinyl ethers is preferable.

Content rate of monomer unit of the copolymerizable monomers in the unsaturated carboxylic ester based polymer is preferably 1 mass % or more, more preferably 5 mass % or more, and its upper limit is 15 mass % or less. By including the copolymer component in the above range, it is possible to inhibit dissolution of the binder into the electrolytic solution.

In the unsaturated carboxylic ester based polymer preferably used in the present invention, among the above copolymerizable monomers, it is preferable to use a crosslinkable monomer. By using the crosslinkable monomer as the copolymerizable monomer, it is possible to inhibit dissolution of the binder into the electrolytic solution. The above crosslinkable monomer may include carboxylic acid esters having two or more carbon-carbon double bonds such as ethylene glycol dimethacrylate, diethylene glycol dimethacrylate and trimethylolpropane triacrylate; amide-based monomers such as acrylamide, N-methylol acrylamide and acrylamide 2-methylpropanesulfonic acid; carboxylic acid esters including an epoxy structure such as glycidyl methacrylate; and vinyl ethers such as allylglycidylether. Rate of monomer unit of the crosslinkable monomers in the unsaturated carboxylic ester based polymer is preferably 0.5 mass % or more, more preferably 1 mass % or more, and its upper limit is 5 mass % or less. By including the crosslinkable monomer in the above range, it is possible to obtain stable binder, and to inhibit dissolution of the binder into the electrolytic solution.

Preferable specific examples of the unsaturated carboxylic ester based polymer used in the present invention may include butyl acrylate-acrylonitrile-allylglycidyl methacrylate, butyl acrylate-acrylonitrile-N-methylol acrylamide, butyl acrylate-methyl methacrylate-methacrylic acid-acrylonitrile-glycidyl methacrylate, acrylic acid 2-ethylhexyl-methacrylic acid-acrylonitrile-ethylene glycol dimethacrylate copolymer, acrylic acid 2-ethylhexyl-methacrylic acid-acrylonitrile-glycidyl methacrylate, acrylic acid 2-ethylhexyl-methacrylic acid-methacrylonitrile diethylene glycol dimethacrylate copolymer, butyl acrylate-acrylonitrile-diethylene glycol dimethacrylatecopolymer, butyl acrylate-acrylic acid-trimethylolpropane trimethacrylate copolymer, etc.

The binder used in the present invention is preferably dissolved when immersed in the after-mentioned inorganic filler dispersion medium at 60° C. for 72 hours. By using the binder dissolvable when immersed in the inorganic filler dispersion medium at 60° C. for 72 hours as the binder, the inorganic filler dispersion medium can easily penetrate in the binder layer of the electrode active material layer when the electrode active material layer is impregnated therewith, so that it is possible to prevent permeation into the interface between the collector and the electrode active material layer. The term "being dissolved" here means the state where a binder sheet having a thickness of 50 µm, prepared by drying aqueous dispersion of the binder under nitrogen atmosphere at 120° C. for 5 hours, no longer retains its original shape when 10 g of the binder sheet is immersed in 100 g of inorganic filler dispersion medium at 60° C. for 72 hours.

The glass-transition temperature of the binder used in the present invention is preferably 0° C. or less, further preferably −10° C. to −70° C. By making the glass-transition temperature of the binder within the above range, the island phases of the binder can easily be fused in the composite membrane of the thickener and the binder, so that it is possible to expand the island structure.

The binder used in the present invention is preferably aqueous dispersion of particulate polymers. Also, average particle size of the particulate polymers (volume average particle size D50) is preferably 0.01 to 5.0 µm, more preferably 0.05 to 2.0 µm. By making the average particle size within the above range when the binder is particulate polymer, it is possible to obtain uniform sea-island structure in the composite membrane formed by the binder and the thickener.

The method for producing the particulate polymer is not particularly limited, and it is possible to employ any method such as solution polymerization method, suspension polymerization method and emulsion polymerization method. As a polymerization initiator used for polymerization, for example, there may be mentioned organic peroxide such as lauroyl peroxide, diisopropyl peroxy dicarbonate, di-2-ethylhexyl peroxy dicarbonate, t-butyl peroxy pivalate and 3,3,5-trimethylhexanoyl peroxide, azo compound such as α,α'-azobisisobutyronitrile, or ammonium persulfate and potassium persulfate.

Content rate of the binder in the electrode active material layer is, in solid content, 0.1 to 10 parts by mass, preferably 0.2 to 8 parts by mass, further preferably 0.5 to 2 parts by mass, per 100 parts by mass of the electrode active material. By making the content rate of the binder in the electrode active material layer within the above range, strength and flexibility of the obtained electrode become good.

As the binder used in the present invention, in addition to the above unsaturated carboxylic ester based polymer, other polymers may be used together in the range not to impair the effects of the present invention. As the other polymers, there may be mentioned styrene-butadiene based polymer, acrylonitrile butadiene based copolymer, polyethylene, polytetrafluoroethylene (PTFE), polyvinylidene fluoride (PVDF), tetrafluoroethylene-hexafluoropropylene copolymer (FEP), polyacrylic acid derivatives, polyacrylonitrile derivatives, etc. Content rate of the above other polymers in the whole binder is 20 mass % or less.

<Thickener>

As the thickener used in the present invention, any thickener may be used as far as the binder can form spherical island phase having an average diameter of 0.5 µm or more in the cross-section of the composite membrane including the binder and the thickener, and carboxymethyl cellulose is desirable in view of high adhesion strength between the collector and the electrode active material layer.

Carboxymethyl cellulose is an anionic water-soluble polymer obtained by reacting cellulose with base such as sodium hydroxide, then reacting the same with monochloroacetate and the like, and partially substituting hydroxyl groups of the cellulose with carboxymethyl groups (etherification). The number of etherified hydroxyl groups per structural unit (anhydroglucose) is defined as degree of etherification. The carboxymethyl cellulose having degree of etherification of 1 or less has structures expressed by the following chemical formulas (1) and (2):

[Chemical Formula (1)]

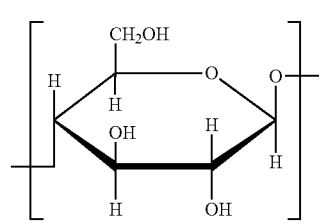

[Chemical Formula (2)]

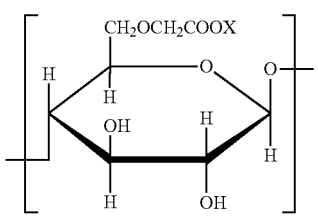

(2)

(in the formula, "X" is an atom or group selected from Na, $NH_4$, Ca, K, Li, Al, Mg and H).

The degree of polymerization of the thickener is 1,000 to 3,000, preferably 1,200 to 2,500, more preferably 1,500 to 2,000. By setting the degree of polymerization of the thickener within the above range, strength of the electrode active material layer can be improved, resulting in improving adhesion strength of the electrode.

The carboxymethyl cellulose having degree of etherification of more than 1 is those in which the remaining hydroxyl groups are further etherified in the above formula (2).

The degree of etherification is normally 0.3 to 1.7, preferably 0.4 to 1.6, further preferably 0.5 to 1.5. When the degree of etherification is within this range, it is possible to show excellent affinity with the binder and to obtain uniform sea-island structure in the composite membrane formed by the binder and the thickener.

"X" in the above formula (2) is preferably Na, $NH_4$, Li, K and H. Also, there may be more than one structures having different "X". When "X" is any of the above atoms or group, the electrode active materials can be well dispersed, and workability of the electrode slurry can be good.

Content rate of the thickener in the electrode active material layer is, in solid content, preferably 0.1 to 10 parts by mass, more preferably 0.2 to 8 parts by mass, further preferably 0.5 to 2 parts by mass, per 100 parts by mass of the electrode active material. When the content rate of the thickener in the electrode active material layer is within the above range, strength and flexibility of the obtained electrode can be good.

In the present invention, the binder forms the spherical island phase having an average diameter of 0.5 μm or more in the cross-section of the composite membrane when the composite membrane including the thickener and the binder is formed. The above condition in which the binder "forms the spherical island phase having an average diameter of 0.5 μm or more" means that the island phase of the binder present in the cross-section of the above composite membrane has an average diameter of 0.5 μm or more which is measured by the following method.

The above composite membrane has a thickness of about 5 to 10 μm, which can be obtained by preparing a solution in which the binder and 1% aqueous solution of the thickener are mixed in the ratio of 1:10 (ratio in solid content), and then coating the solution on the collector followed by drying. Water is used for the solvent for preparing the above solution, and solid content concentration of the above solution is adjusted to have 1 to 1.5 mass %.

Thus obtained composite membrane is sectioned by microtome to expose its cross-section for performing electron microscope observation. 10 observed island phases are arbitrarily selected, and its average diameter is determined as a size of an island phase.

<Other Component>

In the present invention, the electrode active material layer may contain a conductivity providing agent and a reinforcing material. As the conductivity providing agent, conductive carbon such as acetylene black, Ketjen black, graphite, vapor-grown carbon fiber and carbon nanotube can be used. There may be mentioned carbon power such as black lead, fiber or foil of a variety of metals, etc. As the reinforcing material, a variety of inorganic and organic fillers having spherical shape, sheet shape, rod shape or fibrous form can be used. By using the conductivity providing agent, it is possible to improve electric interengagement between the electrode active materials, and to improve discharge rate characteristic when used in a lithium-ion secondary battery. The used amount of the conductivity providing agent is normally 0 to 20 parts by mass, preferably 1 to 10 parts by mass, per 100 parts by mass of the electrode active material.

The electrode active material layer can be formed by applying the electrode active material dispersion slurry on the collector followed by drying. The electrode active material dispersion slurry comprises the above mentioned electrode active material, the binder, the thickener, other components and electrode active material dispersion solvent.

Solvent used for the active material dispersion solvent in the present invention is not particularly limited and is preferably water.

The electrode active material dispersion slurry can be obtained by mixing the electrode active material, the binder, the thickener and the electrode active material dispersion solvent by using a blending machine.

Mixing of the electrode active material dispersion slurry may be done by collectively providing each of the above components into the blending machine. It is preferable that the thickener is mixed in the solvent to disperse the electrode active material to particles, followed by adding the binder for further mixing because the dispersibility of the slurry can be improved.

For the blending machine of the electrode active material dispersion slurry, ball mill, sand mill, pigment dispersing machine, stone mill, ultrasonic dispersing machine, homogenizer, planetary mixer, Hobart mixer and the like can be used.

The method for electrode active material layer may be any of those in which the electrode active material layers are bound to at least one surface, preferably both surfaces, of the collector in layers. For example, the electrode active material dispersion slurry is coated onto the collector, dried and then heat-treated at 120° C. for 1 hour to form the electrode active material layer.

The method for coating the electrode active material dispersion slurry on the collector is not particularly limited. There may be mentioned, for example, doctor blade method, dip method, reverse roll method, direct roll method, gravure method, extrusion method, brush method, etc.

For the drying method, for example, there may be mentioned drying by warm air, hot air or low wet air, vacuum drying, drying method with irradiation of (far-)infrared rays, electron beam and the like.

Then, it is preferable to lower porosity of the electrode active material layer by pressure treatment with mold press, roll press and the like. The preferable range of the porosity is 5% to 15%, more preferably 7% to 13%. Too high porosity may cause to deteriorate charge efficiency and discharge efficiency. Too low porosity may cause problems such that high volume capacity can hardly be obtained, and that the collector-electrode active material layer can easily be peeled off to cause defect. Furthermore, when using a curable polymer, it is preferable to cure the polymer.

The thickness of the electrode active material layer is normally 5 to 300 µm, preferably 10 to 250 µm, for both positive electrode and negative electrode.

<Porous Membrane Layer>

The porous membrane layer includes inorganic filler as an essential component.

As the inorganic filler, inorganic oxide is preferable, and for example, alumina (aluminum oxide), magnesia (magnesium oxide), calcium oxide, titania (titanium oxide), zirconia (zirconium oxide), talc, and silica stone are preferably used.

In the present invention, the porous membrane layer includes inorganic filler as an essential component and preferably, further includes binder (hereinafter may also be referred to as "porous membrane binder"). When the porous membrane layer includes porous membrane binder, it may cause to increase the strength of the porous membrane layer, and to inhibit problems such as breaking.

The porous membrane binder is not particularly limited, and a variety of resin components and soft polymers can be used.

For example, as the resin component, it is possible to use polyethylene, polytetrafluoroethylene (PTFE), polyvinylidene fluoride (PVDF), tetrafluoroethylene hexafluoropropylene copolymer (FEP), polyacrylic acid derivative and polyacrylonitrile derivative, etc. These can be used alone or in combination of two or more.

As the soft polymer, there may be mentioned acrylic soft polymer which is a homopolymer of acrylic acid or methacrylic acid derivative or a copolymer of the same with its copolymerizable monomer, such as poly butyl acrylate, poly butyl methacrylate, poly hydroxyethyl methacrylate, polyacrylamide, polyacrylic nitrile, butyl acrylate-styrene copolymer, butyl acrylate-acrylic nitrile copolymer and butyl acrylate-acrylic nitrile-glycidyl methacrylate copolymer;

isobutylene-based soft polymer such as polyisobutylene, isobutylene-isoprene rubber and isobutylene-styrene copolymer;

diene-based soft polymer such as polybutadiene, polyisoprene, butadiene-styrene random copolymer, isoprene-styrene random copolymer, acrylic nitrile-butadiene copolymer, acrylic nitrile-butadiene-styrene copolymer, butadiene-styrene-block copolymer, styrene-butadiene-styrene-block copolymer, isoprene-styrene-block copolymer and styrene-isoprene-styrene-block copolymer;

silicon containing soft polymer such as dimethyl polysiloxane, diphenyl polysiloxane and dihydroxy polysiloxane;

olefinic soft polymer such as liquid polyethylene, polypropylene, poly-1-butene, ethylene-α-olefin copolymer, propylene-α-olefin copolymer, ethylene-propylene-diene copolymer (EPDM) and ethylene-propylene-styrene copolymer;

vinyl-based soft polymer such as polyvinyl alcohol, polyvinyl acetate, polyvinyl stearate and vinyl acetate-styrene copolymer;

epoxy-based soft polymer such as polyethylene oxide, polypropylene oxide and epichlorohydrin rubber;

fluorine containing soft polymer such as vinylidene fluoride-based rubber and ethylene tetrafluoride-propylene rubber; and other soft polymer such as natural rubber, polypeptide, protein, polyester thermoplastic elastomer, vinyl chloride-based thermoplastic elastomer and polyamide thermoplastic elastomer, etc. Among these, acrylic soft polymer is preferable, and acrylic soft polymer containing acrylonitrile polymeric unit is further preferable. When the binder is the above copolymer, it is possible to make the porous membrane hardly be deformed without elution into the electrolytic solution. Furthermore, swellability of the electrolytic solution is kept even at high temperature but the binder is hardly eluted, showing excellent high temperature characteristics. By combination of this binder and the above-mentioned nonconductive particle, safety of the porous membrane can further be improved.

Glass-transition temperature of the porous membrane binder preferably used for the porous membrane layer is preferably 15° C. or less, further preferably 0° C. or less because flexibility can be given to the porous membrane at room temperature and it is possible to inhibit chap at wind-up of roll and at winding, crack of the porous membrane layer, etc. The glass-transition temperature of the porous membrane binder can be adjusted by changing the use rate of the monomers constituting the polymer and the like.

Weight average molecular weight of the porous membrane binder preferably used for the porous membrane layer is preferably 5,000 or more, further preferably 10,000 or more, and is preferably 10,000,000 or less. When the weight average molecular weight of the porous membrane binder is within the above range, dispersibility of the inorganic filler and strength of the porous membrane layer can be excellent.

Content rate of the porous membrane binder in the porous membrane is, per 100 parts by mass of the inorganic filler, preferably 0.1 to 10 parts by mass, more preferably 1 to 5 parts by mass. By setting the content rate of the porous membrane binder in the porous membrane within the above range, it is possible to block the movement of Li and to inhibit increase in resistance while maintaining bindability between the inorganic fillers, bindability of the filler to the electrode and flexibility.

The porous membrane layer of the present invention can be produced by applying the inorganic filler dispersing slurry having the above-mentioned predetermined solid content composition in the inorganic filler dispersion medium onto the above electrode active material layer, followed by drying. Also, the porous membrane layer can be formed by immersing the electrode active material layer formed on the collector in the inorganic filler dispersing slurry, followed by drying the same.

The inorganic filler dispersion medium used for the inorganic filler dispersing slurry is not particularly limited as far as it can uniformly disperse the above solid content (inorganic filler and porous membrane binder).

In general, as aromatic hydrocarbon, there may be mentioned benzene, toluene, xylene, ethylbenzene, etc., and as chlorine based aliphatic hydrocarbon, there may be mentioned methylene chloride, chloroform and carbon tetrachloride. As other possible media, there may be illustrated pyridine, acetone, dioxane, dimethylformamide, methyl ethyl ketone, diisopropyl ketone, cyclohexanone, tetrahydrofuran, n-butyl phthalate, methyl phthalate, ethyl phthalate, tetrahydrofurfuryl alcohol, ethyl acetate, butyl acetate, 1-nitropropane, carbon disulfide, tributyl phosphate, cyclohexane, cyclopentane, xylene, methyl cyclohexane, ethyl cyclohexane, N-methylpyrrolidone etc. These solvents can be used either alone or as a mixed solvent.

Among these, solvents which are excellent in dispersibility of the inorganic filler, and have low boiling point and high volatility are particularly preferable because the solvents can be removed for a short time and at low temperature. Specifically, acetone, cyclohexanone, cyclopentane, tetrahydrofuran, cyclohexane, xylene or N-methylpyrrolidone, or mixed solvents of these are preferable. Further in view of low volatility and excellent workability at applying the slurry, cyclohexanone, xylene or N-methylpyrrolidone, or mixed solvents of these are particularly preferable.

Solid content concentration of the inorganic filler dispersing slurry is not particularly limited as far as the slurry has viscosity and fluidity enough for the above applying and immersing procedures, and is in general 20 to 50 mass % or so.

Method for producing the inorganic filler dispersing slurry is not particularly limited, but it is possible to obtain dispersing slurry in which the inorganic fillers are highly dispersed regardless of mixing method, mixing sequence and the like. The blending machine is not particularly limited as far as it can mix uniformly the components, ball mill, sand mill, pigment dispersing machine, stone mill, ultrasonic dispersing machine, homogenizer, planetary mixer and the like can be used. Also, it is particularly preferable to use high-performance dispersing device such as bead mill, roll mill and Fillmix able to add high shear force.

The method for applying the inorganic filler dispersing slurry on the electrode active material layer is not particularly limited. There may be mentioned, for example, doctor blade method, dip method, reverse roll method, direct roll method, gravure method, extrusion method, brush method, etc.

For the drying method, for example, there may be mentioned drying by warm air, hot air or low wet air, vacuum drying, drying method with irradiation of (far-)infrared rays, electron beam and the like.

Membrane thickness of the porous membrane layer is not particularly limited and can be properly determined depending on the use of the membrane or applied area. The thickness is preferably 0.5 to 50 μm, more preferably 0.5 to 10 μm, because uniform membrane cannot be formed when it is too thin, or capacity per volume (weight) is decreased in a cell when it is too thick.

(Lithium-Ion Secondary Battery)

The lithium-ion secondary battery of the present invention comprises a positive electrode, negative electrode and electrolyte solution, and at least one of the positive electrode and negative electrode is the above electrode of the present invention. In the lithium-ion secondary battery of the present invention, the above electrode of the present invention may be used either for a positive electrode or negative electrode, or may be used for both positive electrode and negative electrode.

(Electrolytic Solution)

The electrolytic solution used in the present invention is not particularly limited, and for example, those in which lithium salt is dissolved as a supporting electrolyte in a non-aqueous solvent can be used. The lithium salt may include, for example, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$ and $(C_2F_5SO_2)NLi$. Particularly, $LiPF_6$, $LiClO_4$ and $CF_3SO_3Li$, easily dissolved in the solvent to exhibit a high degree of dissociation, are preferably used. These can be used alone or in combination of two or more. Amount of the supporting electrolyte is, with respect to the electrolytic solution, normally 1 mass % or more, preferably 5 mass % or more, and normally 30 mass % or less, preferably 20 mass % or less. When the amount of the supporting electrolyte is either too small or too large, ion conductivity can be declined and charge-discharge characteristic of the cell can be deteriorated.

The solvent used for the electrolytic solution is not particularly limited as far as it can dissolve the supporting electrolyte, and normally, alkyl carbonates such as dimethyl carbonate (DMC), ethylene carbonate (EC), diethyl carbonate (DEC), propylene carbonate (PC), butylene carbonate (BC) and methyl ethyl carbonate (MEC); esters such as γ-butyrolactone and methyl formate; ethers such as 1,2-dimethoxy ethane and tetrahydrofuran; sulfur-containing compounds such as sulfolane and dimethyl sulfoxide; etc. can be used. Particularly, since it is easy to obtain high ion conductivity and operating temperature limit is large, dimethyl carbonate, ethylene carbonate, propylene carbonate, diethyl carbonate and methyl ethyl carbonate are preferable. These can be used either alone or in combination of two or more.

Also, it is possible to include an additive in the above electrolytic solution. For the additive, carbonate based compound such as vinylene carbonate (VC) is preferable.

As an electrolytic solution in addition to the above, there may be mentioned gel polymer electrolyte obtained by impregnating polymer electrolyte such as polyethylene oxide and polyacrylonitrile with electrolytic solution, inorganic solid electrolyte such as LiI and $Li_3N$.

(Separator)

The separator is a porous substrate having pore portion, and available separators include (a) porous separator having pore portion, (b) porous separator where polymer coating layer is formed on one surface or both surfaces, or (c) porous separator where porous resin coating layer containing inorganic ceramic powder is formed. The non-limiting examples thereof may include solid polyelectrolyte or gel polyelectrolyte polymer film such as polypropylene-based, polyethylene-based, polyolefin-based or aramid-based porous separator, polyvinylidene fluoride, polyethylene oxide, polyacrylonitrile and polyvinylidene fluoride hexafluoropropylene copolymer, a separator coated with gel polymer coating layer, or a separator coated with porous membrane layer including inorganic filler and dispersant for the inorganic filler.

(Method for Producing Battery)

The method for producing the lithium-ion secondary battery of the present invention is not particularly limited. For example, a negative electrode and a positive electrode may be layered via the separator, which is then winded or bended depending on the battery shape to fit in the battery case, followed by filling the electrolytic solution in the battery case and sealing the case. Also, as needed, it is possible to prevent pressure increase inside the battery and overcharge-overdischarge by setting in expanded metal, overcurrent protection element such as fuse and PTC element, and lead plate, etc. The shape of the battery may include coin shape, button shape, sheet shape, cylinder shape, square shape and flattened shape.

EXAMPLES

The present invention will be explained based on the following examples, but the present invention is not limited to the examples. Note that in the following examples, "part" and % are mass standard unless otherwise designated.

(Adhesion Strength)

The electrodes before and after applying the porous membrane layer were respectively cut into a rectangular test specimen with a width of 2.5 cm and a length of 10 cm, and fixed such that the electrode active material layer surface was faced up. After cellophane tape was attached onto the electrode active material layer surface of the test specimen, the cellophane tape was pulled to peel from one end of the test specimen in 180-degree direction at pulling speed of 50 mm/min, and the stress was measured. Ten measurements were done to obtain the average value, which was determined as peel strength. Change rate of the peel strengths before and after applying the porous membrane layer was expressed by the following formula, and evaluation was done by the following standards. Smaller change rate indicates excellent adhesion strength.

Change rate=[(Peel strength before applying the porous membrane layer)−(Peel strength after applying the porous membrane layer)]/(Peel strength before applying the porous membrane layer)×100     [Formula 1]

A: less than 10%
B: 10% or more to less than 20%
C: 20% or more to less than 30%
D: 30% or more to less than 40%
E: 40% or more (Swelling of Electrode)

Thickness of the electrode active material layer in the electrode calculated by subtracting the thickness of the porous membrane layer and collector from electrode thickness where the porous membrane layer was formed on the electrode active material layer, and thickness of the electrode active material layer calculated by subtracting thickness of the collector before forming the porous membrane layer on the electrode active material layer were respectively calculated based on measurements. Change rate in thickness of the electrode active material layer before and after applying the porous membrane layer was expressed as swelling of the electrode by the following formula, and evaluation was done by the following standards.

Rate of swelling=[(thickness of the electrode active material layer before applying the porous membrane layer)−(thickness of the electrode active material layer after applying the porous membrane layer)]/(thickness of the electrode active material layer before applying the porous membrane layer)×100     [Formula 2]

A: less than 3%
B: 3% or more to less than 5%
C: 5% or more to less than 7%
D: 7% or more to less than 10%
E: 10% or more (Flexibility of Porous Membrane Layer)

The electrode in which the porous membrane layer adheres on the surface of the electrode active material layer was winded in one layer on a fixed round bar having a diameter of 1.9 mm such that the porous membrane layer was faced outward. Then, 300 g of load was applied vertically downward to both ends of the electrode. In the state, the surface of bend portion of the porous membrane layer was observed with a microscope of 100 times power. When there was no crack in the porous membrane, the sample was evaluated as "Good", and when minimal crack was found, it was evaluated as "Bad".

(Evaluation of Phase-Separated Structure of Composite Membrane of Binder and Thickener)

The binder and 1% aqueous solution of carboxymethyl cellulose were mixed in a ratio of 1:10 (ratio based on solid content) to adjust solid content concentration to 1.1%, and the solution was coated on the collector followed by drying to obtain a composite membrane having a thickness of about 5 μm. Then, the obtained composite membrane was sectioned by microtome to expose its cross-section for performing electron microscope observation. 10 observed island phases were arbitrarily selected, and its average diameter was determined as a size of an island phase. Evaluation was done by the following standards.

A: 0.5 μm or more
B: 0.4 μm or more to less than 0.5 μm
C: 0.3 μm or more to less than 0.4 μm
D: 0.2 μm or more to less than 0.3 μm
E: less than 0.2 μm

Example 1

(A) Production of Binder

To a polymerization can A, 12 parts of butyl acrylate, 0.4 part of acrylonitrile, 0.05 part of sodium lauryl sulfate and 70 parts of ion-exchange water were added, and 0.2 part of ammonium persulfate was added as a polymerization initiator, and agitated for 120 hours. Then, to another polymerization can B, 82 parts of butyl acrylate, 3.6 parts of acrylonitrile, 2 parts of allylglycidyl methacrylate, 0.2 part of sodium lauryl sulfate and 30 parts of ion-exchange water were added to prepare emulsion by stirring the mixture. Thus-prepared emulsion was serially added from the polymerization can B to the polymerization can A over about 420 minutes, followed by stirring for about 300 minutes, and the reaction was terminated by cooling when monomer consumption reached 95%, so that aqueous dispersion of unsaturated carboxylic ester based polymer (binder) particles was obtained. In the above polymer, content rate of monomer unit of acrylic acid alkyl ester (butyl acrylate) was 94%; content rate of monomer unit of crosslinkable monomer was 2% in terms of content rate of crosslinkable monomer (allylglycidyl methacrylate); content rate of monomer unit of other copolymerizable monomer (acrylonitrile) was 4%; and the glass-transition temperature was −35° C. The average particle size of the polymer particles was 0.36 μm. Note that the glass-transition temperature of homopolymer of butyl acrylate was −55° C.

(B) Preparation of Electrode Active Material Layer 100 parts of artificial graphite as the electrode active material, 2.5 parts of the above binder (solid content concentration 40%), 100 parts of carboxymethyl cellulose aqueous solution (solid content concentration 1%), having degree of etherification of 0.8 and degree of polymerization of 1,600, as the thickener, and appropriate quantities of water were stirred by a planetary mixer to prepare electrode active material dispersion slurry. The above electrode slurry was coated on copper foil having a thickness of 18 μm by a comma coater such that membrane thickness after drying was 120 μm or so, dried at 60° C. for 20 minutes, and heat treated at 150° C. for 2 hours to obtain a pre-electrode. The pre-electrode was extended on by applying pressure using a roll press, to prepare an electrode having a density of 1.6 g/cm$^3$, which includes copper foil and electrode active material layer where the thickness was controlled to 100 μm. The phase-separated structure of the above binder-thickener composite membrane was evaluated. The results are shown in Table 1.

(C) Preparation of Inorganic Filler Dispersing Slurry

Inorganic filler (alumina having an average particle size of 300 nm), butyl acrylate acrylonitrile copolymer (glass-transition temperature −8° C.) in 2.5 parts per 100 parts of the inorganic filler, and N-methylpyrrolidone were mixed to have solid content concentration of the obtained mixture of 20%, and dispersed by using a bead mill to prepare inorganic filler dispersing slurry.

(D) Formation of Porous Membrane Layer

The obtained inorganic filler dispersing slurry was coated on the surface of the above electrode active material layer, and dried with hot air at 110° C., so that an electrode for a lithium-ion secondary battery having a dry coating film of porous membrane layer having a thickness of 3 μm was obtained. Adhesion strength of the obtained electrode for a lithium-ion secondary battery, and swelling and flexibility of the electrode were evaluated. Evaluation results are shown in Table 1.

Example 2

To a polymerization can A, 0.3 part of sodium dodecylbenzenesulfonate and 70 parts of ion-exchange water were added, and immediately after 0.5 part of ammonium persulfate was added as a polymerization initiator, an emulsion, prepared by adding 92 parts of 2-ethylhexyl acrylate, 4 parts of acrylonitrile, 2 parts of methacrylic acid, 2 parts of glycidyl methacrylate, 0.5 part of sodium dodecylbenzenesulfonate and 60 parts of ion-exchange water in a polymerization can B followed by stirring, was serially added to the polymerization can A over about 180 minutes followed by stirring for about 180 minutes. The reaction was terminated by cooling when monomer consumption reached 94%, so that aqueous dispersion of unsaturated carboxylic ester based polymer (binder) particles was obtained. In the above polymer, content rate of monomer unit of acrylic acid alkyl ester (2-ethylhexyl acrylate) was 92%; content rate of monomer unit of crosslinkable monomer was 2% in terms of content rate of crosslinkable monomer (glycidyl methacrylate); content rate of monomer unit of other copolymerizable monomers (acrylonitrile and methacrylic acid) was 6%; and glass-transition temperature was −48° C. Also, the average particle size of polymer particles was 0.31 μm. Note that the glass-transition temperature of homopolymer of 2-ethylhexyl acrylate was −65° C.

Except for using the above-prepared binder as the binder used for the electrode active material layer, phase-separated structure of a binder-thickener composite membrane was evaluated, and an electrode for a lithium-ion secondary battery was obtained, as in Example 1. The adhesion strength of the electrode, and swelling and flexibility of the electrode were evaluated. Evaluation results are shown in Table 1.

Example 3

To the polymerization can A, 34 parts of methyl methacrylate, 2.0 parts of sodium dodecylbenzenesulfonate, and 60 parts of ion-exchange water were added, and as the polymerization initiator, 0.12 part of ammonium persulfate was added for reaction for 30 minutes. Then, an emulsion, prepared by adding 54 parts of butyl acrylate, 6 parts of acrylonitrile, 4 parts of methacrylic acid, 2 parts of glycidyl methacrylate, 0.6 part of sodium dodecylbenzenesulfonate and 60 parts of ion-exchange water in a polymerization can B followed by stirring, was serially added to the polymerization can A over about 210 minutes followed by stirring for about 120 minutes. The reaction was terminated by cooling when monomer consumption reached 95%, so that aqueous dispersion of unsaturated carboxylic ester based polymer (binder) particles was obtained. In the above polymer, content rate of monomer unit of acrylic acid alkyl ester was 88% (methyl methacrylate 34%, butyl acrylate 54%); content rate of monomer unit of crosslinkable monomer was 2% in terms of content rate of crosslinkable monomer (glycidyl methacrylate); content rate of monomer unit of other copolymerizable monomer (acrylonitrile, methacrylic acid) was 10%; and glass-transition temperature was 1° C. Also, the average particle size of polymer particles was 0.21 μm. Note that the glass-transition temperature of homopolymer of butyl acrylate was −55° C., and the glass-transition temperature of homopolymer of methyl methacrylate was 105° C.

Except for using the above-prepared binder as the binder used for the electrode active material layer, phase-separated structure of a binder-thickener composite membrane was evaluated, and an electrode for a lithium-ion secondary battery was obtained, as in Example 1. The adhesion strength of the electrode, and swelling and flexibility of the electrode were evaluated. Evaluation results are shown in Table 1.

Example 4

Except for using carboxymethyl cellulose having degree of polymerization of 1,200 and degree of etherification of 0.65 as the thickener, phase-separated structure of a binder-thickener composite membrane was evaluated, and an electrode for a lithium-ion secondary battery was obtained, as in Example 1. The change rate of peel strength of the electrode, and swelling and flexibility of the electrode were evaluated. Evaluation results are shown in Table 1.

Comparative Example 1

To a polymerization can A, 0.05 part of sodium lauryl sulfate and 70 parts of ion-exchange water were added, and immediately after 0.2 part of ammonium persulfate was added as a polymerization initiator, an emulsion, prepared by adding 80 parts of butyl acrylate, 16 parts of acrylonitrile, 4 parts of glycidyl methacrylate, 1 part of sodium lauryl sulfate and 60 parts of ion-exchange water in a polymerization can B followed by stirring, was serially added to the polymerization can A over about 180 minutes followed by stirring for about 120 minutes. The reaction was terminated by cooling when monomer consumption reached 95%, so that aqueous dispersion of unsaturated carboxylic ester based polymer (binder) particles was obtained. In the above polymer, content rate of monomer unit of acrylic acid alkyl ester (butyl acrylate) was 80%; content rate of monomer unit of crosslinkable monomer was 4% in terms of content rate of crosslinkable monomer (glycidyl methacrylate); content rate of monomer unit of other copolymerizable monomer (acrylonitrile) was 16%; and the glass-transition temperature was −10° C. The average particle size of polymer particles was 0.32 μm.

Except for using the above-prepared binder as the binder used for the electrode active material layer, phase-separated structure of a binder-thickener composite membrane was evaluated, and an electrode for a lithium-ion secondary battery was obtained, as in Example 1. The adhesion strength of the electrode, and swelling and flexibility of the electrode were evaluated. Evaluation results are shown in Table 1.

Comparative Example 2

To a 5-MPa polymerization can with stirrer, 47 parts of styrene, 49 parts of 1,3-butadiene, 3 parts of methacrylic acid, 1 part of acrylic acid, 5 parts of sodium dodecylbenzenesulfonate, 150 parts of ion-exchange water and as the polymerization initiator, 1 part of potassium persulfate were placed, and thoroughly stirred, followed by starting polymerization by heating at 45° C. The reaction was terminated by cooling when monomer consumption reached 96.0%, so that aqueous dispersion of SB based polymer (binder) particles was obtained. The average particle size of the polymer particles was 0.12 μm, and the glass-transition temperature was −15° C.

Except for using the above-prepared binder as the binder used for the electrode active material layer, phase-separated structure of a binder-thickener composite membrane was evaluated, and an electrode for a lithium-ion secondary battery was obtained, as in Example 1. The adhesion strength of the electrode, and swelling and flexibility of the electrode were evaluated. Evaluation results are shown in Table 1.

TABLE 1

|  | Example 1 | Example 2 | Example 3 | Example 4 | Comparative Example 1 | Comparative Example 2 |
|---|---|---|---|---|---|---|
| Binder | Unsaturated carboxylic ester based polymer | | | | | SB based polymer |
| Content rate of acrylic acid alkyl ester monomer unit in binder (mass %) | 94 | 92 | 88 | 94 | 80 | 0 |
| Evaluation of phase-separated structure of the binder-thickener composite membrane | A | A | A | A | C | E |
| Adhesion strength | A | A | B | C | D | E |
| Swelling of electrode | A | A | B | B | D | E |
| Flexibility of porous membrane | Good | Good | Good | Good | Bad | Bad |

From the results shown in Table 1, when using a binder, which formed a spherical island phase having an average diameter of 0.5 μm or more in a cross-section of the composite membrane including the binder and the thickener, as the binder used for the electrode active material layer, a change rate of peel strength and swelling of electrode were small and flexibility of the porous membrane was excellent. Among the examples, in Example 1 and Example 2, in which unsaturated carboxylic ester-based monomer having glass-transition temperature of −10° C. or less was used as the binder and content rate of acrylic acid alkyl ester monomer unit was 90 mass % or more, all evaluations of phase-separated structure of the binder-thickener composite membrane, adhesion strength, swelling of electrode and flexibility of porous membrane layer were excellent.

On the other hand, when using a binder, which did not form a spherical island phase having an average diameter of 0.5 μm or more in a cross-section of the composite membrane including the binder and the thickener, as the binder used for the electrode active material layer, peel strength was declined in the electrode active material layer after applying the porous membrane layer, swelling of an electrode was large, and flexibility of the porous membrane was bad (Comparative Examples 1 and 2).

As described above, in the present invention, reduction in peel strength of the electrode active material layer after applying the porous membrane layer and swelling of electrode were not found. Also, in relation to these, it was possible to confirm improvement in flexibility by bending because of high adhesion strength of the electrode active material layer.

The invention claimed is:

1. An electrode for a lithium-ion secondary battery comprising
an electrode active material layer including an electrode active material, a thickener and a binder, and
a porous membrane layer including inorganic filler,
wherein the electrode active material layer is bound to at least one surface of a collector, and the porous membrane layer is applied onto the electrode active material layer,
wherein said binder is unsaturated carboxylic ester based polymer in which a content rate of an acrylic acid alkyl ester monomer unit is 85 mass % to 99 mass %,
wherein said thickener is carboxymethyl cellulose having a degree of polymerization of 1,000 to 3,000, and
wherein said binder forms a spherical island phase having an average diameter of 0.5 μm or more in a cross-section of a composite membrane obtained by preparing a solution in which the binder and 1% aqueous solution of the thickener are mixed in the ratio of 1:10 (ratio in solid content) so as to be adjusted solid content concentration of the solution to have 1 to 1.5 mass % and then coating the solution on the collector followed by drying.

2. The electrode for a lithium-ion secondary battery as set forth in claim 1, wherein a glass-transition temperature of a homopolymer of said acrylic acid alkyl ester monomer is −70° C. to −20° C.

3. A lithium-ion secondary battery, provided with a positive electrode, a negative electrode and an electrolytic solution, wherein at least one of said positive electrode and negative electrode is the electrode as set forth in claim 1 or 2.

* * * * *